(12) United States Patent
Almkvist et al.

(10) Patent No.: US 6,575,129 B2
(45) Date of Patent: Jun. 10, 2003

(54) METHOD OF REDUCING EMISSIONS IN THE EXHAUST GASES OF AN INTERNAL COMBUSTION ENGINE

(75) Inventors: Göran Almkvist, Gråbo; Karin Thorn; Sten Sjöström, both of Göteborg, all of (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 10/063,057

(22) Filed: Mar. 15, 2002

(65) Prior Publication Data

US 2002/0088229 A1 Jul. 11, 2002

Related U.S. Application Data

(63) Continuation of application No. PCT/SE00/02052, filed on Oct. 23, 2000, now abandoned.

(51) Int. Cl.[7] ............................. F01N 3/18; F02N 17/02
(52) U.S. Cl. ........................... 123/142.5 R; 123/90.15; 60/284
(58) Field of Search .................. 123/142.5 R, 406.53, 123/406.55, 90.15, 90.16, 90.17, 90.18, 339.24; 60/284

(56) References Cited

U.S. PATENT DOCUMENTS

| | | | | |
|---|---|---|---|---|
| 4,327,676 A | * | 5/1982 | McIntire et al. | 123/90.16 |
| 5,228,422 A | * | 7/1993 | Wakeman | 123/308 |
| 5,265,418 A | * | 11/1993 | Smith | 123/142.5 R |
| 5,398,502 A | * | 3/1995 | Watanabe | 123/90.15 |
| 5,483,946 A | * | 1/1996 | Hamburg et al. | 123/339.24 |
| 5,626,109 A | * | 5/1997 | Yasumura et al. | 123/90.15 |
| 5,850,811 A | | 12/1998 | Tomisawa et al. | |
| 5,992,143 A | * | 11/1999 | Manaka et al. | 60/276 |
| 6,360,531 B1 | * | 3/2002 | Wiemero et al. | 123/299 |
| 6,394,051 B1 | * | 5/2002 | Filipe et al. | 123/306 |

FOREIGN PATENT DOCUMENTS

| | | |
|---|---|---|
| DE | 3506107 A1 | 8/1985 |
| EP | 0718475 A1 | 6/1996 |
| EP | 0826870 A2 | 3/1998 |
| WO | WO 9116529 A1 | 10/1991 |

* cited by examiner

*Primary Examiner*—Erick Solis
(74) *Attorney, Agent, or Firm*—Howrey Simon Arnold & White LLP

(57) ABSTRACT

The invention discloses a method of reducing emissions in the exhaust gases of an internal combustion engine having at least one cylinder to which an air/fuel mixture is supplied when a crankshaft of the internal combustion engine rotates, at least one inlet valve, at least one exhaust valve, control members for controlling the opening and closing of the inlet and exhaust valves, and a piston reciprocating between a top dead-center position and a bottom dead-center position in the cylinder. The method includes the steps of supplying an air/fuel mixture with lambda value greater than 1 to the cylinder, controlling the internal combustion engine so that it works at high load, and controlling the inlet valve so that it opens after the piston has passed the top dead-center position. According to an embodiment of the invention, the internal combustion engine is controlled so that the crankshaft rotates at an essentially constant speed within a range of about 1000 to about 2000 rpm.

14 Claims, 1 Drawing Sheet

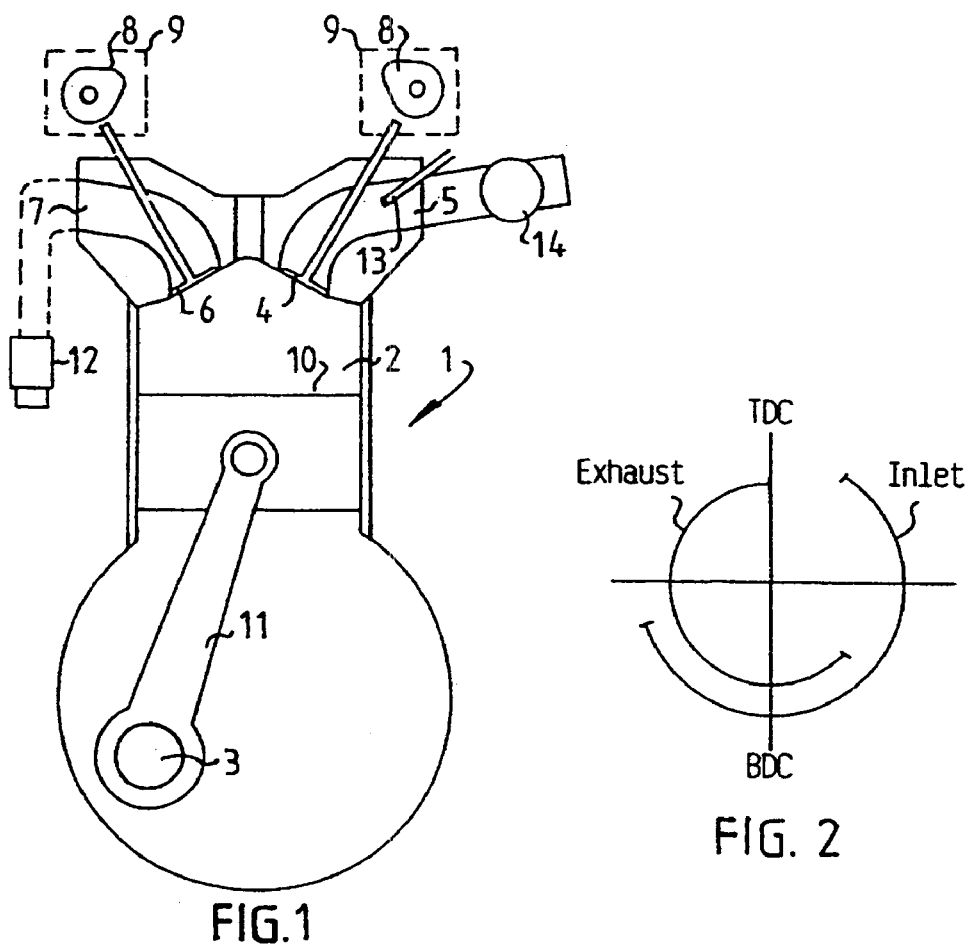
FIG. 1
FIG. 2
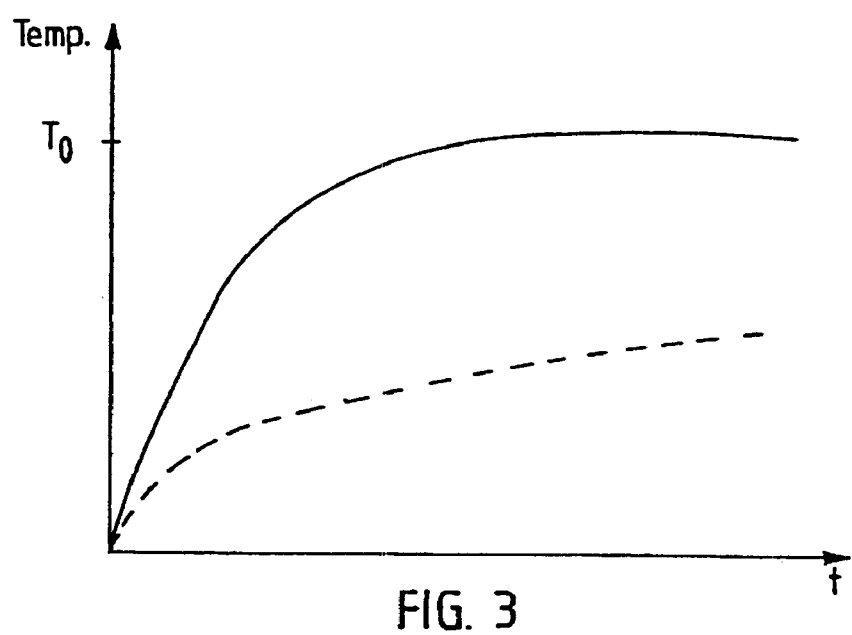
FIG. 3

METHOD OF REDUCING EMISSIONS IN THE EXHAUST GASES OF AN INTERNAL COMBUSTION ENGINE

CROSS REFERENCE TO RELATED APPLICATIONS

The present application is a continuation of International Application No. PCT/SE00/02052, filed Oct. 23, 2000 and published in English pursuant to PCT Article 21(2), now abandoned, and which claims priority to Swedish Application No. 9903836-6, filed Oct. 25, 1999.

BACKGROUND OF INVENTION

Technical Field. The present invention relates to a method of reducing emissions in the exhaust gases of an internal combustion engine having at least one cylinder supplied with an air/fuel mixture when a crankshaft of the internal combustion engine rotates, at least one inlet valve, at least one inlet duct connected to the inlet valve, at least one exhaust valve, control members for controlling the opening and closing of the inlet and exhaust valves, and a piston reciprocating between a top dead-center position and a bottom dead-center position in the cylinder.

Background Information. It is desirable to reduce noxious emissions present in the exhaust gases of an internal combustion engine in order to reduce pollution of the surrounding environment and to satisfy legal requirements for internal combustion engines. The undesirable emissions present in the exhaust gases include, inter alia, carbon monoxide ("CO"), hydrocarbon compounds ("HC") and nitrogen oxides ("$NO_x$").

In order to reduce these emissions in the exhaust gases, the engine is provided with a catalytic converter that, by means of a chemical reaction, burns the above mentioned emissions completely. This chemical reaction occurs in the catalytic converter only when the catalytic converter has reached a predetermined working temperature, which is reached after a predetermined operating time of the engine. Accordingly, during cold-starting of the engine there is no reduction of the above mentioned emissions in the catalytic converter.

There are known arrangements for heating the catalytic converter during cold starts in order to rapidly reach a desirable working temperature of the catalytic converter, making it possible to reduce the emissions in the exhaust gases of the engine at an early stage. In such a known arrangement, an electric heating element is arranged in the catalytic converter. However, this arrangement makes the catalytic converter complicated and expensive to produce.

Another problem that occurs when internal combustion engines are cold-started is a comparatively great amount of fuel in relation to the air supplied, or a rich air/fuel mixture, has to be supplied to the engine in order for the engine to start and be capable of working at an essentially constant speed when idling. This rich air/fuel mixture is also supplied so that the engine can provide increased torque when the accelerator is operated, and so that the engine is less sensitive to different fuel qualities. The drivability of the engine is thereby ensured before the engine has reached its operating temperature.

Without emission control of the catalytic converter and the rich air/fuel mixture, the content of CO, HC and $NO_x$ emitted from the engine is consequently high when the engine is cold-started.

Previous attempts have been made to reduce the quantity of fuel in relation to the air supplied, i.e., run the engine with a leaner air/fuel mixture when the engine is cold-started. These attempts have resulted in both the engine working very unevenly when idling and poor drivability of the engine. The engine speed varies while idling because the torque generated by the engine is very sensitive to variations in a lambda value of the air/fuel mixture supplied to the cylinder space of the engine when the air/fuel mixture is lean. The definition of the lambda value, or the excess air factor as it is also known, is the actual air quantity supplied divided by the air quantity theoretically necessary for complete combustion. If the lambda value is greater than 1, the air/fuel mixture is lean and, if the lambda value is less than 1, the air/fuel mixture is rich.

The fuel supplied from a fuel injection valve can be controlled accurately by means of the fuel injection system of the engine in order to obtain a substantially constant lambda value for the air/fuel mixture supplied. However, when the engine is cold, fuel condenses on the comparatively cold walls in the inlet duct and in the cylinder. The fuel condensed on the walls vaporizes and accompanies the air/fuel mixture flowing in the inlet duct and supplied to the cylinder space. If the vaporization of the fuel condensed on the walls is uneven, for example, due to pressure variations, temperature gradients, or the flow rate of the air/fuel mixture in the inlet duct, the lambda value of the air/fuel mixture supplied to the cylinder space will vary.

As the torque generated by the engine varies while idling when cold-started, the speed of the engine varies. In this connection, the speed of the engine refers to the speed of rotation of the engine crankshaft. When the speed varies, the pressure in the inlet duct also varies, resulting in the vaporization of the condensed fuel varying, so that a variation of the lambda value of the air/fuel mixture supplied to the cylinder space occurs. This intensifies the uneven speed of the engine.

SUMMARY OF INVENTION

The present invention provides a method of reducing carbon monoxide CO, hydrocarbon compounds HC and nitrogen oxides NOx in the exhaust gases of an internal combustion engine when cold-started.

The invention further provides a method for an internal combustion engine to work with a lean air/fuel mixture.

With the present invention, the working temperature of the catalytic converter can be rapidly reached. Additionally, the working temperature of the internal combustion engine can be rapidly reached.

This is accomplished by a method including the steps of supplying an air/fuel mixture with a lambda value greater than 1 to the cylinder, controlling the internal combustion engine so that it works at high load, and controlling the inlet valve so that it opens after the piston has passed the top dead-center position.

By supplying an air/fuel mixture greater than 1 to the cylinder, the total amount of emissions in the exhaust gases emitted from the internal combustion engine is reduced. In order to make it possible to operate the engine with a lean air/fuel mixture, the inlet valve is opened after the piston has passed the top dead-center position, thereby obtaining a powerful swirling of the air/fuel mixture supplied to the cylinder space. By controlling the engine so that it works at high load, condensed fuel on the walls of the inlet duct will have little effect on the mixing ratio between the air and the fuel, resulting in the lambda value of the air/fuel mixture supplied to the cylinder space remaining substantially constant. The crankshaft will thus rotate at a substantially constant speed when idling. Furthermore, the amount of residual gases are minimized as there is no overlap when the inlet and exhaust valves are open.

BRIEF DESCRIPTION OF DRAWINGS

The invention is explained in greater detail below with reference to an exemplary embodiment shown in the appended drawings, in which:

FIG. 1 shows a section through an internal combustion engine;

FIG. 2 shows a diagram of the opening and closing times of the inlet valve and the exhaust valve; and FIG. 3 shows a diagram of the heating time of the catalytic converter for a conventionally controlled internal combustion engine and an internal combustion engine controlled according to the method according to the present invention.

DETAILED DESCRIPTION

FIG. 1 shows an internal combustion engine 1 having at least one cylinder 2 supplied with an air/fuel mixture when a crankshaft 3 of the engine 1 rotates. At least one inlet valve 4 is arranged so as to open and close inlet ducts 5 connected to the cylinder 2. Through this at least one inlet valve 4 an air/fuel mixture is supplied when the engine 1 is working.

At least one exhaust valve 6 is arranged so as to open and close exhaust ducts 7 connected to the cylinder 2. Through this at least one exhaust valve 6 burnt fuel in the form of exhaust gases is removed when the engine 1 is working.

The engine 1 also includes control members 8 for controlling the opening and closing of the inlet and exhaust valves 4, 6. In the exemplary embodiment shown in FIG. 1, the control members 8 consist of camshafts which can be adjustable so that the time of opening and closing of the inlet and exhaust valves 4, 6 can be varied. This is brought about by, for example, a regulating arrangement 9 shown diagrammatically in FIG. 1. In a known manner, this regulating arrangement 9 rotates the camshafts hydraulically. Other control members 8 are also possible, such as electromagnetically controlled valves.

A piston 10, which reciprocates between a top and a bottom dead-center position in the cylinder 2, is mounted on the crankshaft 3 by means of a connecting rod 11. The engine 1 is preferably of the multi-cylinder type. Fuel is supplied through an injection nozzle 13 arranged in the inlet duct 5. The fuel is injected into the inlet duct 5 in the direction of the inlet valve 4 and cylinder 2.

An exhaust turbo or a mechanical compressor 14 can be coupled to the inlet duct 5 of the engine 1. For a supercharged engine 1, energy is supplied from the compressor or the turbo 14 so that the combustion temperature increases further after the expansion in the cylinder 2. A catalytic converter 12 coupled to the engine 1 can thus also be heated more rapidly.

The exhaust turbo or the compressor 14 also brings about a positive pressure in the inlet duct 5, resulting in an increase in the difference between the negative pressure in the cylinder 2 immediately before the inlet valve 4 opens and the positive pressure in the inlet duct 5.

An exemplary embodiment of the method according to the present invention is shown in FIG. 2. FIG. 2 shows a diagram of the opening and closing times of both inlet and exhaust valves 4, 6. During the induction stroke, an air/fuel mixture with a lambda value greater than 1 is supplied to the cylinder 2. The lambda value lies principally within the range of about 1.0 to about 1.4, and preferably within the range of about 1.05 to about 1.2. The content of CO, NC and $NO_x$ in the exhaust gases depends on, inter alia, the mixing ratio of the air/fuel mixture supplied to the cylinder 2. This mixing ratio is usually indicated by a lambda value. The definition of the lambda value, or the excess air factor as it is also known, is the actual air quantity supplied divided by the air quantity theoretically necessary. If the lambda value is greater than 1, the air/fuel mixture is lean and, if the lambda value is smaller than 1, the air/fuel mixture is rich. Preferably, a lean air/fuel mixture is supplied when the engine is cold so that the content of CO, NC and $NO_x$ emitted from the engine 1 in the form of exhaust gases is low. By reaching the working temperature of the catalytic converter at an early stage, the total quantity of CO, HC and $NO_x$ emitted is reduced.

In order to prevent the operation of the engine 1 from becoming uneven when a lean air/fuel mixture is supplied (for the reasons indicated above), the inlet valve 4 is controlled so that it opens after the piston 10 has passed the top dead-center position. By controlling the inlet valve 4 so that it opens at a crankshaft angle of about 20° to about 100° after the top dead-center position, preferably at a crankshaft angle of about 30° after the top dead-center position, a negative pressure occurs in the cylinder 2. At the crankshaft angles indicated above, the inlet valve 4 will be sufficiently open for the air/fuel mixture to be allowed to flow into the cylinder 2.

However, a prerequisite for a negative pressure being formed in the cylinder 2 is controlling the exhaust valve 6 so that it closes before the inlet valve 4 opens. The exhaust valve 6 is preferably controlled so that it closes when the piston 10 is at about top dead center. Both the exhaust valve 6 and the inlet valve 4 are thus closed at the same time as the piston 10 moves downwards in the direction of bottom dead center, resulting in a negative pressure forming in the cylinder 2.

When the inlet valve 4 is then opened, the air/fuel mixture flows into the cylinder 2 at a great flow rate on account of the negative pressure in the cylinder 2. This great flow rate contributes to a desirable swirling and thus mixing of the air/fuel mixture. By opening the inlet valve 4, as described above, exhaust gases are also prevented from flowing into the inlet duct 5.

If exhaust gases were to flow into the inlet duct 5, it would affect the vaporization of fuel condensed on the walls of the inlet duct 5, leading to a change in torque of the crankshaft 3 of the engine 1, and thus uneven operation of the engine 1. In this regard, the crankshaft angle refers to the angle through which the crankshaft 3 has rotated since the piston 10 was located in the top dead-center position. When the piston 10 is located in the top dead-center position, the crankshaft angle is therefore zero. The procedure also results in the remaining amount of exhaust gases, also known as the residual, in the cylinder 2 being minimized, contributing to improved combustion quality of the air/fuel mixture supplied to the cylinder 2. The inlet valve 4 can be controlled so that it closes after the piston 10 has reached bottom dead center.

When a cold internal combustion, engine 1 is started, the catalytic converter 12 in the engine 1 is also cold. As mentioned above, the catalytic converter 12 has to reach a certain working temperature in order for the catalytic converter 12 to effectively reduce the toxic emissions in the exhaust gases of the engine 1.

Ignition of the air/fuel mixture supplied to the cylinder 2 is carried out at a crankshaft angle of about 10° before to about 30° after the top dead-center position, preferably at a crankshaft angle of about 0° to about 10° after the top dead-center position. In this manner, the engine 1 is controlled so that it works at high load, because the shifted ignition time results in the power of the engine 1 being lower. The engine 1 can also be controlled to work at high load by closing the inlet valve 4 late, allowing some of the air/fuel mixture supplied to the cylinder 2 to be led back to the inlet duct 5. A lean air/fuel mixture also results in the engine 1 working at high load. At high load of the internal combustion engine 1, the negative pressure in the inlet duct 5 is small even at great speed. The power of the engine 1 is thus lower. It is also possible to control the engine 1 so that it works at high load by connecting an external load, such as a generator (not shown), to the engine 1.

By injecting fuel into the inlet duct S before the inlet valve 4 has opened, the fuel will be supplied to the cylinder 2 together with the induction air at a very great rate. The fuel will thus be finely distributed and mixed with the induction air.

The engine 1 is preferably controlled so that the crankshaft 3 rotates at an essentially constant speed within the range of about 1000 to about 2000 revolutions per minute (rpm), which means that a great many working cycles per unit of time are obtained, in turn leading to a great amount of energy per unit of time in the form of heat being supplied to the catalytic converter 12. This results in rapid heating of the catalytic converter 12 and the engine 1.

FIG. 3 shows a diagram of the heating time of the catalytic converter 12 for a conventionally controlled internal combustion engine and an internal combustion engine 1 controlled according to the method according to the present invention. The solid curve in FIG. 3 relates to the heating time of the catalytic converter 12 for an internal combustion engine controlled according to the method according to the present invention, and the broken line relates to the "heating time of the catalytic converter for a conventionally controlled internal combustion engine. As can be seen from the diagram in FIG. 3, the catalytic converter 12 of an engine 1 controlled according to the method according to the present invention will reach the working temperature earlier than the catalytic converter of an engine controlled conventionally.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A method of reducing emissions in the exhaust gases of an internal combustion engine having at least one cylinder supplied with an air/fuel mixture when a crankshaft of the internal combustion engine rotates, at least one inlet valve, at least one inlet duct connected to the inlet valve, at least one exhaust valve, control members for controlling the opening and closing of the inlet and exhaust valves, and a piston reciprocating between a top dead-center position and a bottom dead-center position in the cylinder, the method comprising the steps of:

supplying an air/fuel mixture with a lambda value greater than 1 to the cylinder, controlling the internal combustion engine so that it works at high load, and controlling the inlet valve so that it opens after the piston has passed the top dead-center position.

2. The method according to claim 1 further comprising the step of controlling the inlet valve is so that it opens at a crankshaft angle of about 20° to about 100° after the top dead-center position.

3. The method according to claim 2 further comprising the step of controlling the inlet valve is so that it opens at a crankshaft angle of about 30° after the top dead-center position.

4. The method according to claim 1 further comprising the step of controlling the exhaust valve so that it closes before the inlet valve opens.

5. The method according to claim 1 further comprising the step of controlling the exhaust valve so that it closes in the top dead-center position, thereby minimizing exhaust gases remaining in the cylinder.

6. The method according to claim 1 further comprising the step of supplying fuel to the inlet duct before the inlet valve opens.

7. The method according to claim 1 further comprising the step of controlling the internal combustion engine so that the crankshaft rotates at an essentially constant speed within a range of about 1000 to about 2000 rpm.

8. The method according to claim 1 further comprising the step of controlling bringing about a positive pressure in the inlet duct by means of an exhaust turbo or a compressor.

9. The method according to claim 1 further comprising the step of carrying out ignition of the air/fuel mixture supplied to the cylinder at a crankshaft angle of about 10° before to about 20° after the top dead-center position.

10. The method according to claim 9 further comprising the step of carrying out ignition of the air/fuel mixture supplied to the cylinder at a crankshaft angle of about 0° to about 10° after the top dead-center position.

11. The method according to claim 1 wherein the lambda value of the air/fuel mixture combusted during the expansion stroke lies within the range of about 1.0 to about 1.4.

12. The method according to claim 11 wherein the lambda value of the air/fuel mixture combusted during the expansion stroke lies within the range of about 1.05 to about 1.2.

13. The method according to claim 1 further comprising the step of using the method when cold-starting the internal combustion engine.

14. The method according to claim 1 wherein the control members for controlling the opening and closing of the inlet and exhaust valves are adjustable, thereby permitting the time of opening and closing of the inlet and exhaust valves to be varied.

* * * * *